United States Patent Office 3,278,816
Patented Oct. 11, 1966

3,278,816
ELECTRICAL CAPACITOR
Fritz Gaenge, Munich, and Walter Völkl, Grunwald, near Munich, Germany, assignors to Siemens & Halske Aktiengesellschaft, Berlin and Munich, Germany, a corporation of Germany
Filed Aug. 21, 1962, Ser. No. 218,366
Claims priority, application Germany, Aug. 24, 1961, S 75,424
2 Claims. (Cl. 317—258)

The invention disclosed herein relates to an electrical capacitor comprising coatings of alternately different polarity which are separated by dielectric layers interposed therebetween, and is particularly concerned with a wound or wrapped capacitor for low operating voltages and having high volume capacity (specific capacity per volume unit), which is constructed of thin foils with a thickness of less than 6 microns.

It is already known to produce electrical capacitors with particularly high volume capacity, by using varnish layers instead of self-supporting dielectric layers such as paper bands or bands made of synthetic material, the thickness of such varnish layers being considerably less than would be required for a self-supporting processing thereof. In order to enable the processing of these thin varnish layers, metal foils have been used as carriers, such metal foils also serving as coatings, and to provide thereon the varnish layers and also the opposing coatings, if desired by vaporizing thereon a metal layer. A greater space is thereby required only by the metallic carrier foils. Still higher volume capacities are obtained when providing, as is likewise known, varnish layers upon suitable auxiliary carrier foils, vaporizing coatings upon the varnish layers, and effecting, incident to the wrapping of capacitors, separation of the coated varnish layers from the auxiliary carriers.

It is in this manner possible to produce capacitors with very high volume capacity. However, it was found that the dielectric of thin foils produced in this manner is still of a thickness the breakdown strength of which is for many purposes relatively high, and that it would be from the point of view of voltage stability quite desirable to use still thinner dielectric layers. The realization of an improvement in this direction is however faced with the fact that the mechanical processing of such thin foils, with a thickness less than a given amount, entails great difficulties even with the use of auxiliary carrier foils.

There is a possibility of obtaining thinner dielectric layers by mutually mechanically interconnecting a plurality of successive coatings and dielectric layers, which may be done by placing upon the first varnish layer alternately a plurality of further metal layers and varnish layers. However, such a structure also has various disadvantages. The production is made more difficult and more expensive and, in the case of a relatively great number of successive layers, a fault happening in the production of one of the layers will make the entire structure worthless.

In order to overcome these disadvantages and to obtain a capacitor with extraordinarily high volume capacity, it is in accordance with the invention proposed to make the dielectric layers, disposed between coatings of opposite polarity, of different thickness, and to dispose such layers so that a dielectric layer of greater thickness always alternates with a layer of lesser thickness.

It is in the production of electrical wrapped capacitors customary to wind upon one another two or more bands or strips which jointly contain the oppositely polarized coatings and two dielectric layers. The thickness of each individual band must not go below a given lower limit since it otherwise would not have sufficient mechanical strength which is required for the processing thereof. The total thickness of the structure of layers formed by the two dielectric layers, assuming that it is formed of two mechanically independent bands, is accordingly fixed at a given minimum thickness. Upon using very thin vaporized metallic coatings, this minimum thickness is equal to the sum of the thickness of the two dielectric layers. It is in the production of electrical capacitors generally customary to make the two dielectric layers of equal thickness. This results in the advantage of obtaining equal voltage stability or strength of the two layers. On the other hand, the total capacity $C_{ges}$ of a capacitor amounts, in dependence upon the thickness $d_1$ and $d_2$ of the two dielectric layers to $$C_{ges} = K \frac{1}{d_1 + d_2} \left( \frac{(1+d_1)(d_2)^2}{4d_1/d_2} \right)$$

The proportionality factor K contains the dependence of the capacity upon the length and width of the wound bands.

Further details of the invention will appear in the course of the description thereof which is rendered below with reference to the accompanying drawings.

FIG. 1 is a graph showing the dependence of the total capacity of a capacitor made of a plurality of coatings and dielectric layers, upon the ratio of layer thickness $d_1$ to $d_2$ at a constant total thickness $d_1 + d_2$;

FIG. 2 indicates in cross-sectional representation two coatings 3 and 4 of opposite polarity, separated by dielectric layers 1 and 2 with the thicknesses $d_1$ and $d_2$;

FIG. 3 shows in sectional view an example of a capacitor customarily formed of dielectric layers 1 and 2 and coatings 3 and 4 such as are illustrated in FIG. 2;

Figure 6:
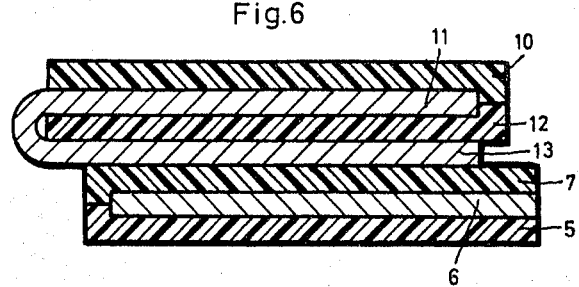

FIG. 6 indicates likewise in sectional view a further embodiment.

Figure 1:
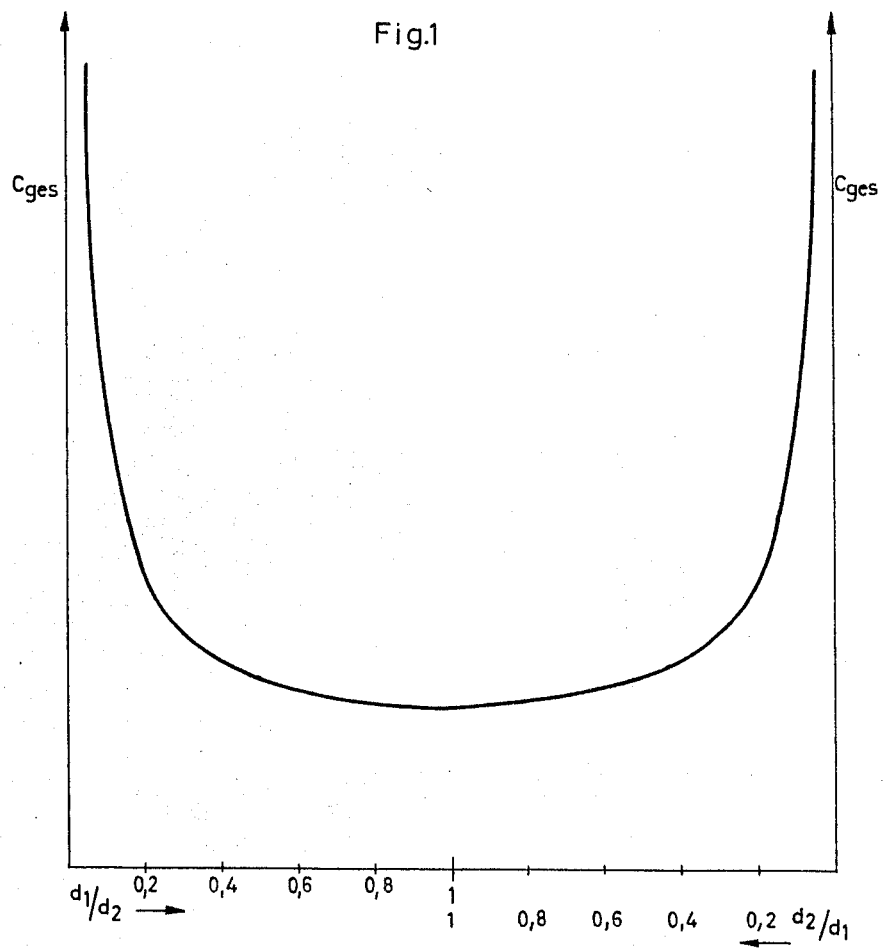

In FIG. 1, the dependence of the total capacity $C_{ges}$ is plotted against the ratio of the thicknesses $d_1 + d_2$ of the two dielectric layers, it being assumed that the sum of the thicknesses $d_1 + d_2$ of the two dielectric layers is maintained constant. As will be seen, this function has a minimum at the point of equal thickness of the dielectric layers. It follows, therefore, that a higher capacity can be obtained by the use of dielectric layers of different thickness. Different thickness of the dielectric layers results as a rule in different breakdown strength of the two layers and consequently in a relatively unfavorable voltage stability or strength. However, this is in many cases of no importance since the corresponding capacitors are intended for use with relatively low operating voltages.

According to an advantageous feature of the invention, equal voltage stability can be obtained despite different thickness of the two dielectric layers, by using dielectric layers with different breakdown strength. The vaporization of metal coatings upon a dielectric layer forming a support therefor, reduces the breakdown strength of such dielectric layer, owing to the formation of metallic peaks in pores and holes therein, and it is therefore of great advantage to provide coatings in the form of vaporized metal, preferably aluminum coatings, upon the thicker dielectric layers, while no metal is vaporized upon the thinner dielectric layers.

The invention is in particularly simple manner realized by placing upon a suitable auxiliary carrier foil, for example, upon a paper band impregnated with a high melting hydrocarbon substance, a first varnish layer, vaporizing on this first varnish layer a regenerative thin aluminum coating, but leaving a marginal zone free of such coating, and placing upon the aluminum coating a second varnish layer. This three-layer foil is incident to the wrapping or winding operation separated from the carrier foil and is wound jointly with a thin layer foil which is produced in similar manner but does not have a second varnish layer provided upon a metal coating. The two composite foils or bands are thereby so arranged that the second varnish layer formed on the metal coating, which second varnish layer is preferably thinner and, as far as possible, appreciably thinner, than the first varnish layer, form one dielectric layer, that is, the thinner dielectric layer, while the thicker dielectric layer of the capacitor is formed by the varnish layer of the same band, which is disposed underneath the metal coating, jointly with the varnish layer of the second band. The varnish layer lying above the metal coating is free of metal peaks and therefore has a higher breakdown strength than the varnish layer disposed underneath the metal coatings. It is in this manner possible to provide for the thinner dielectric layer the same breakdown strength as for the thicker dielectric layer formed by the other two varnish layers.

A structure differing somewhat from the above described embodiment is obtained by using in place of the second band which consists of a varnish layer and a coating vaporized thereon, another band on the coating of which is provided a second varnish layer and upon the latter a second metal coating, the two metal coatings being conductively interconnected. Since the two varnish layers have jointly a greater mechanical strength than one such layer taken by itself, the first varnish layer may be made thinner, thereby resulting a further increase of the volume capacity. The second varnish layer which is disposed in the field-free space and which is dielectrically ineffective, may be made of a material having particular mechanical strength, or of a substance which is adapted to favorably affect the regenerative function of the capacitor, or such substances may be embedded therein.

Figure 3:
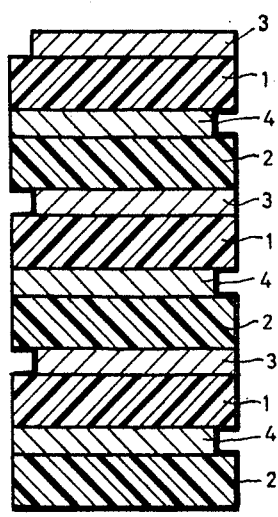
Figure 2:
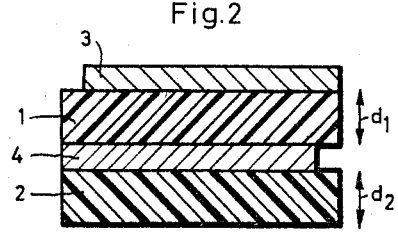

It is in the capacitor art generally customary to construct, with the aid of various methods, including winding, folding, stacking and the like, capacitors employing elements such as shown in FIG. 2, comprising two dielectric layers 1 and 2 and two coatings 3 and 4, an example of such a capacitor being represented in FIG. 3. It will be seen from this figure that elements corresponding to those shown in FIG. 2 are disposed in succession so that identical dielectric layers and coatings appear periodically in the respective series of elements.

Figure 4:
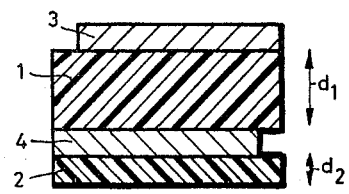
FIG. 4 represents in sectional view a non-symmetrical construction wherein the dielectric layers are of different thickness.

It was until now customary to use, as shown in FIGS. 2 and 3, dielectric layers with the same thickness $d_1$ and $d_2$, thus resulting in a wholly symmetrical arrangement of parts. However, a non-symmetrical arrangement, such as shown by way of example in FIG. 4, wherein the thickness $d_1$ of one layer (1) is greater than the thickness $d_2$ of another layer (2), will result in an increase of the volume capacity. It is of course understood that the same result will be obtained by making the thickness of the layer 2 greater than that of the layer 1.

Figure 5:
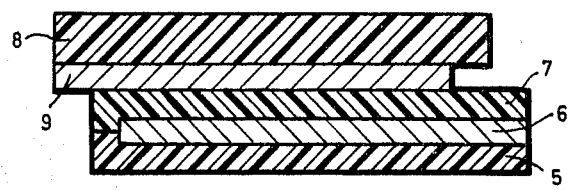
FIG. 5 shows in sectional view an embodiment according to the invention.

FIG. 5 shows an embodiment according to the invention, wherein two thin foil bands are disposed, for example, wound, one above the other, one band comprising a first varnish layer 5, a metal coating 6 and a second varnish layer 7, while the other band comprises a varnish layer 8 and a metal coating 9 provided thereon. The metal coatings, preferably regenerable thin aluminum coatings, are vaporized on the respective varnish layers 5 and 8 and parts thereof enter in the vaporization process into pores, holes, and fissures occurring along the surfaces of the varnish layers 5 and 8, forming projections and peaks therein which reduce the breakdown strength of the varnish layers 5 and 8. The varnish layer 7 which does not have a metal coating vaporized thereon has a relatively higher breakdown strength than the other two varnish layers 5 and 8. It will be appreciated that it is with appropriate dimensioning, for example, by making the varnish layer 7 thicker, preferably considerably thicker than the varnish layer 5, possible to make the breakdown strength of the thinner dielectric layer formed by the varnish layer 7 so that it is not lower than the breakdown strength of the thicker dielectric layer formed jointly by the varnish layers 5 and 8.

FIG. 6 shows another embodiment of the invention. The capacitor is in this case likewise produced of two bands, one of such bands being formed of two varnish layers 5 and 7 and a metal coating 6, just as in the embodiment shown in FIG. 5, and the other band being formed of a first varnish layer 10, a metal coating 11 provided thereon, a varnish layer 12 placed on the metal layer 11, and a metal coating 13 connected with the metal coating 11. All metal coatings are in this embodiment preferably vaporized aluminum coatings forming thin, regenerative layers. The vaporization of the coating metal on the respective varnish layer provides a molecular bond between the respective parts. The second varnish layer 12 which is disposed in the field-free space, serves primarily for increasing the mechanical strength of the second capacitor band, the purpose thereof being mainly to use a thinner first varnish layer 10. This is in particularly simple manner achieved when making the second varnish layer 12 of a substance with very high mechanical strength. It is, however, also possible to make the varnish layer 12 so that it favorably affects by its composition the regenerative function of the capacitor. It is possible to reduce in this manner regenerative capacitors even with dielectric layers 5, 7 and 10 made of substances which tend to form upon breakdown conductive or corrosive products.

The invention is not inherently limited to the described and illustrated examples but admits many possibilities for variations. For example, a single composite band instead of two bands may be used for winding a capacitor.

Changes may be made within the scope and spirit of the appended claims which define what is believed to be new and desired to have protected by Letters Patent.

We claim:

1. An electrical thin foil capacitor, comprising two capacitor foils of less than $6\mu$ thickness, each foil consisting of several superimposed layers, one of said foils consisting of a first varnish layer, a regenerating metal layer deposited thereon, and a second varnish layer applied to the metal layer, the varnish layers of said first foil being of different thickness; the second foil consisting of at least two layers, comprising a varnish layer and an exposed metal layer deposited thereon, said foils being assembled with the exposed metal layer of the second mentioned foil being disposed against said second varnish layer of the first mentioned foil with an edge of the metal layer of one foil disposed at one end face of the assembly, and an edge of the metal layer of the other foil disposed at the other face of the assembly at which faces the foils may be respectively contacted.

2. An electrical thin foil capacitor according to claim 1, wherein the second mentioned foil consists of a first varnish layer, a first metal layer deposited thereon, a second varnish layer disposed on said metal layer, and an exposed metal layer deposited on said second varnish layer of said second foil, said metal layers of the second foil being connected at one edge forming a field-free space therebetween, with the varnish layer disposed in such space having a high mechanical strength.

(References on following page)

References Cited by the Examiner

UNITED STATES PATENTS 2,728,036 12/1955 Steiner et al. _____ 317—258 X

FOREIGN PATENTS 686,293 1/1953 Great Britain.
723,693 2/1955 Great Britain.
758,784 10//1956 Great Britain.

OTHER REFERENCES

Dummer and Nordenberg: Fixed and Variable Capacitors, McGraw-Hill, New York, N.Y., 1960 (p. 97 relied on).

LEWIS H. MYERS, *Primary Examiner.*

JOHN P. WILDMAN, JOHN F. BURNS, ROBERT K. SCHAEFER, *Examiners.*

W. F. ZAGURSKI, D. J. BADER, *Assistant Examiners.*